United States Patent
Chasse et al.

(10) Patent No.: US 11,195,352 B2
(45) Date of Patent: Dec. 7, 2021

(54) METHOD AND DEVICE FOR ANALYZING THE ENERGY EXPENDITURE DISTRIBUTION OF A MOTOR VEHICLE

(71) Applicant: COMPAGNIE GENERALE DES ETABLISSEMENTS MICHELIN, Clermont-Ferrand (FR)

(72) Inventors: Alexandre Chasse, Paris (FR); Guillaume Sabiron, Lyons (FR); Domenico Di Domenico, Lyons (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 177 days.

(21) Appl. No.: 16/336,319

(22) PCT Filed: Sep. 15, 2017

(86) PCT No.: PCT/EP2017/073273
§ 371 (c)(1),
(2) Date: Mar. 25, 2019

(87) PCT Pub. No.: WO2018/054775
PCT Pub. Date: Mar. 29, 2018

(65) Prior Publication Data
US 2019/0221055 A1 Jul. 18, 2019

(30) Foreign Application Priority Data
Sep. 26, 2016 (FR) ...................................... 1659039

(51) Int. Cl.
*G07C 5/08* (2006.01)
*G07C 5/00* (2006.01)
(Continued)

(52) U.S. Cl.
CPC ............. *G07C 5/085* (2013.01); *G07C 5/008* (2013.01); *G07C 5/0841* (2013.01);
(Continued)

(58) Field of Classification Search
CPC ...... G07C 5/085; G07C 5/0841; G07C 5/008; B60W 2552/20; B60W 2556/45;
(Continued)

(56) References Cited

U.S. PATENT DOCUMENTS 8,694,233 B2  4/2014  Le Brusq et al.
9,043,074 B2  5/2015  Södergren et al.
(Continued)

FOREIGN PATENT DOCUMENTS

DE  11 2012 006 598 B4  4/2015
EP   2 237 985 A1     10/2010
(Continued)

OTHER PUBLICATIONS

Co-pending U.S. Appl. No. 16/314,074, filed Dec. 28, 2018.
International Search Report dated Nov. 13, 2017, in corresponding PCT/EP2017/073273 (6 pages).

*Primary Examiner* — Rodney A Butler
(74) *Attorney, Agent, or Firm* — Venable LLP

(57) ABSTRACT

A method for analyzing the distribution of energy expenditures of a motor vehicle from data from a communications network and from parameters of the vehicle includes steps in which the energy expenditures of the vehicle over a journey are calculated, the said energy expenditures are analyzed by comparing them with at least one model of the vehicle simulating the same journey, an energy balance report is formulated on the basis of the analysis of the energy expenditures and of the fuel consumption and the said energy balance report is communicated to an external server.

7 Claims, 2 Drawing Sheets

(51) Int. Cl.
*B60W 40/13* (2012.01)
*B60W 40/02* (2006.01)
*B60R 16/023* (2006.01)
*B60W 50/00* (2006.01)
*B60W 40/10* (2012.01)
*B60W 40/12* (2012.01)

(52) U.S. Cl.
CPC .......... *B60R 16/0236* (2013.01); *B60W 40/02* (2013.01); *B60W 40/1005* (2013.01); *B60W 40/12* (2013.01); *B60W 40/13* (2013.01); *B60W 2050/0026* (2013.01); *B60W 2050/0031* (2013.01); *B60W 2300/125* (2013.01); *B60W 2510/0623* (2013.01); *B60W 2510/0642* (2013.01); *B60W 2510/305* (2013.01); *B60W 2530/20* (2013.01); *B60W 2552/20* (2020.02); *B60W 2556/45* (2020.02); *Y02T 10/84* (2013.01)

(58) Field of Classification Search
CPC ................. B60W 40/13; B60W 40/02; B60W 2510/0623; B60W 2050/0026; B60W 2050/0031; B60W 2510/305; B60W 40/1005; B60W 40/12; B60W 2510/0642; B60W 2530/20; B60W 2300/125; B60R 16/0236; Y02T 10/84
See application file for complete search history.

(56) References Cited

U.S. PATENT DOCUMENTS

| 9,193,296 | B2 | 11/2015 | Petit et al. | |
|---|---|---|---|---|
| 9,518,832 | B2 | 12/2016 | Kinoshita et al. | |
| 2010/0274426 | A1 | 10/2010 | Le Brusq et al. | |
| 2011/0270486 | A1* | 11/2011 | Stevens | G07C 5/0816 701/31.4 |
| 2014/0121889 | A1 | 5/2014 | Södergren et al. | |
| 2014/0203927 | A1 | 7/2014 | Petit et al. | |
| 2015/0149069 | A1 | 5/2015 | Kinoshita et al. | |
| 2016/0023649 | A1* | 1/2016 | Muller | B60W 10/26 701/22 |

FOREIGN PATENT DOCUMENTS

| FR | 2 976 888 A1 | 12/2012 |
|---|---|---|
| JP | 2010-203405 A | 9/2010 |
| WO | 2013/006118 A1 | 1/2013 |

* cited by examiner

METHOD AND DEVICE FOR ANALYZING THE ENERGY EXPENDITURE DISTRIBUTION OF A MOTOR VEHICLE

BACKGROUND

The present invention relates to the field of energy consumption of motor vehicles, particularly vehicles of the "heavy duty" type fitted with a telematic control unit.

More particularly, the present invention relates to the identification and quantification of energy-consuming elements in a vehicle of the "heavy duty" type.

What is meant by a telematic control unit is any device that makes it possible to receive, in real-time, information about the environment and possibly provide context-specific services to the passengers of the vehicle. Such telematic control units are generally provided with a positioning system, notably of the global positioning system or "GPS" type, which uses position data emitted in real-time by a constellation of geo-stationary satellites in order to determine, with precision, the position of the vehicle.

More particularly, the present invention relates to the analysis of the distribution of energy expenditures of each vehicle within a fleet of vehicles.

Knowing the distribution of energy expenditures of each vehicle within a fleet of vehicles allows the energy consumption of the vehicles to be monitored and optimized better.

There is a need to improve and facilitate the processing of significant volumes of data so as to highlight potential malfunctions within a vehicle or within a fleet of vehicles by performing a full energy balance report.

It is therefore an object of the present invention to meet this need.

SUMMARY

One subject of the invention is a method for analysing the distribution of energy expenditures of a motor vehicle from data from a "CAN" communications network and from parameters of the vehicle, in which:
  the energy expenditures of the vehicle over a journey are calculated,
  the said energy expenditures are analysed by comparing them with at least one model of a vehicle simulating the same journey,
  an energy audit is formulated on the basis of the analysis of the energy expenditures and of the fuel consumption and the said energy balance report is communicated to an external server.

What is meant by "energy expenditures" is all the energies expended at various stages in the drivetrain so that a distribution of the energy expenditures of the vehicle can be established.

What is meant by a "model of the vehicle" is a mathematical representation of the dynamics of the vehicle. Such a model comprises physical parameters of a vehicle on which information is required, inputs and outputs. The physical parameters come from a database or from a map of speed under standard conditions, which means to say at zero gradient, the inputs are signals derived from sensors or standard journey conditions such as the gradient or the speed, and the outputs are energy consumptions. It should be emphasized here that the step of analysing the energy expenditures may involve a comparison with one or more models simulating various journey conditions.

In this way, it is possible to monitor the energy consumption of a vehicle or of a fleet of vehicles in an easy way. In addition, the energy expenditure calculations are performed as close as possible to the vehicle, allowing for an energy balance report that is particularly reliable and accurate.

Advantageously, during the analysis of the energy expenditures, the resistive forces are analysed by comparing the calculated energy expenditures with at least one model of the vehicle, supplied by a database, simulating the same journey under standard conditions, namely without gradient, and the fuel consumption is analysed by comparing the measured fuel consumption with an estimate of the fuel consumption, derived from the said model of the vehicle.

Prior to calculating the energy expenditures of the vehicle, it is possible to collect, from the communications network, data from the group including the volume of fuel injected the indicated combustion engine torque, the engine speed, the combustion engine mechanical friction torque, the vehicle speed, the gearbox gear ratio engaged, the gradient of the roadway, the longitudinal acceleration of the vehicle, the position of the brake pedal and the torque of the retarder. It is also possible to collect, from a database, vehicle parameters that are housed in a computer of the motor vehicle or on a remote server, the parameters being comprised in the group including the radius of the wheels, the mass of the vehicle, the equivalent mass of the rolling elements, the rolling resistance coefficient for the tyres, the vehicle air density, the frontal area of the vehicle, the coefficient of drag, the lower calorific value, the density of the fuel, the axle ratio, the gearbox efficiency, the transmission efficiency, the inertia of the primary shaft and the inertia of the running elements of the engine. In another example, the parameters may likewise be comprised in the group including, the engine idling speed, the mean power approximated by the auxiliary elements, a fuel consumption map and a map of the physical limits of the engine.

In one embodiment, during the step of calculating the energy expenditures:
  the energy produced by burning the fuel is calculated on the basis of the lower calorific value, of the volume of fuel injected and of the density of the fuel,
  the indicated mechanical energy is calculated on the basis of the indicated combustion engine torque and of the engine speed,
  the energy associated with internal friction within the engine is calculated on the basis of the combustion engine mechanical friction torque and of the engine speed,
  the energy expended during the engine idling phases is calculated on the basis of the combustion engine mechanical friction torque, of the engine speed, and of the engine idling speed,
  the energy expended by the auxiliary elements is calculated on the basis of the mean power approximated by the auxiliary elements,
  the mechanical energy on the output side of the engine shaft is calculated on the basis of the indicated combustion engine torque, of the vehicle speed, of the combustion engine mechanical friction torque, and of the gearbox gear ratio engaged,
  the mechanical energies with respect to the wheel are calculated on the basis of the mechanical energy on the output side of the engine shaft, of the radius of the wheels, of the axle ratio, and of the gearbox gear ratio engaged, of the gearbox efficiency, and of the transmission efficiency, the potential energy is calculated on the basis of the mass of the vehicle, of the vehicle speed, and of the gradient of the roadway, the kinetic energy is calculated on the basis of the vehicle speed, of the longitudinal acceleration of the vehicle, of the mass of the vehicle, of the equivalent mass of the rolling elements, of the axle ratio, of the gearbox efficiency, of the transmission efficiency, of the inertia of the primary shaft and of the inertia of the running elements of the engine, of the gearbox gear ratio engaged, and of the radius of the wheels, the energy associated with the aerodynamics of the vehicle is calculated on the basis of the vehicle air density, of the frontal area of the vehicle, of the coefficient of drag, and of the vehicle speed, and the energy associated with the rolling resistance is calculated on the basis of the mass of the vehicle, of the rolling resistance coefficient for the tyres and of the gradient of the roadway.

For example, during the analysis of the resistive forces, the measured energy associated with the resistive forces is calculated on the basis of the mechanical energy on the output side of the engine shaft, of the kinetic energy and of the potential energy, the modelled energy associated with the resistive forces is calculated on the basis of the energy associated with the aerodynamics and of the energy associated with the rolling resistance, and the said energies associated with the resistive forces are compared.

According to one embodiment, during the analysis of the fuel consumption, a first quantity of fuel injected is calculated on the basis of the engine speed and of a fuel consumption map.

According to one embodiment, during the analysis of the fuel consumption, a second quantity of fuel injected is calculated on the basis of the speed profile and of the gradient profile and of an engine map that connects engine speed with effective torque.

According to one embodiment, during the analysis of the fuel consumption, a third quantity of fuel injected is calculated on the basis of the speed profile and of the gradient profile under standard conditions in which the gradient is zero, and a fourth quantity of fuel injected is calculated on the basis of the speed profile and of the gradient profile under standard conditions in which the gradient is zero and on a model of the vehicle simulating the same journey under standard conditions in which the gradient is zero and the said third and fourth quantities of fuel are compared with the said first and second quantities of fuel.

According to one embodiment, the energy expenditures are calculated only if the position of the brake pedal and the retarder torque are zero and no gearshift is in progress.

A second aspect of the invention relates to a device for analysing the distribution of the energy expenditures of a motor vehicle on the basis of data from a communications network and of parameters of the vehicle, comprising a module for formulating an energy balance report for a motor vehicle on a journey and a module for communicating the said energy balance report to an external server, the said module for formulating an energy balance report comprising a module for calculating the energy expenditures of the vehicle on a journey, namely the energies expended at various stages in the drivetrain in order to deduce therefrom a distribution of the energy expenditures of the vehicle, and a module for analysing the energy expenditures of the vehicle as determined by the module for calculating the energy expenditures, by comparing with a model of the vehicle simulating the same journey.

The device comprises a data processing module which as input receives data coming from the communications network, comprised in the group including the volume of fuel injected, the indicated combustion engine torque, the engine speed, the combustion engine mechanical friction torque, the vehicle speed, the gearbox gear ratio engaged, the gradient of the roadway, the longitudinal acceleration of the vehicle, the position of the brake pedal and the torque of the retarder, as well as data derived from a database of vehicle parameters housed in a computer of the motor vehicle or on a remote server, the parameters being comprised in the group including the radius of the wheels, the mass of the vehicle, the equivalent mass of the rolling elements, the rolling resistance coefficient for the tyres, the vehicle air density, the frontal area of the vehicle, the coefficient of drag, the lower calorific value, the density of the fuel, the axle ratio, the gearbox efficiency, the transmission efficiency, the inertia of the primary shaft and the inertia of the running elements of the engine, and three calibration constants comprising the engine idling speed, the mean power approximated by the auxiliary elements, a fuel consumption map and a map of the physical limits of the engine.

The module for calculating the energy expenditures of the vehicle on a journey is configured to calculate:

the energy produced by burning the fuel, on the basis of the lower calorific value, of the volume of fuel injected and of the density of the fuel, the indicated mechanical energy, on the basis of the indicated combustion engine torque and of the engine speed, the energy associated with internal friction within the engine, on the basis of the combustion engine mechanical friction torque and of the engine speed, the energy expended during the engine idling phases, on the basis of the combustion engine mechanical friction torque, of the engine speed, and of the engine idling speed, the energy expended by the auxiliary elements, on the basis of the mean power approximated by the auxiliary elements, the mechanical energy on the output side of the engine shaft, on the basis of the indicated combustion engine torque, of the vehicle speed, of the combustion engine mechanical friction torque, and of the gearbox gear ratio engaged, the mechanical energies with respect to the wheel, on the basis of the mechanical energy on the output side of the engine shaft, of the radius of the wheels, of the axle ratio, of the gearbox efficiency, and of the transmission efficiency, the potential energy, on the basis of the mass of the vehicle, of the vehicle speed, and of the gradient of the roadway, the kinetic energy, on the basis of the vehicle speed, of the longitudinal acceleration of the vehicle, of the mass of the vehicle, of the equivalent mass of the rolling elements of the axle ratio, of the gearbox efficiency, of the transmission efficiency, of the inertia of the primary shaft, of the inertia of the running elements of the engine, of the gearbox gear ratio engaged, and of the radius of the wheels, the energy associated with the aerodynamics of the vehicle, on the basis of the vehicle air density, of the frontal area of the vehicle, of the coefficient of drag, and of the vehicle speed, and the energy associated with the rolling resistance, on the basis of the mass of the vehicle, of the rolling resistance coefficient for the tyres and of the gradient of the roadway.

According to one embodiment, the module for analysing the energy expenditures of the vehicle comprises a module for analysing the resistive forces, that compares the calculated energy expenditures with a model of the vehicle, supplied by a database, simulating the same journey under standard conditions of zero gradient, and a module for analysing the fuel consumption by comparing the measured fuel consumption with an estimate of the fuel consumption, derived from the said model of the vehicle.

BRIEF DESCRIPTION OF THE FIGURES

Other objectives, features and advantages of the invention will become apparent on reading the following description given solely by way of nonlimiting example and with reference to the appended drawings in which.

DETAILED DESCRIPTION

Figure 1:
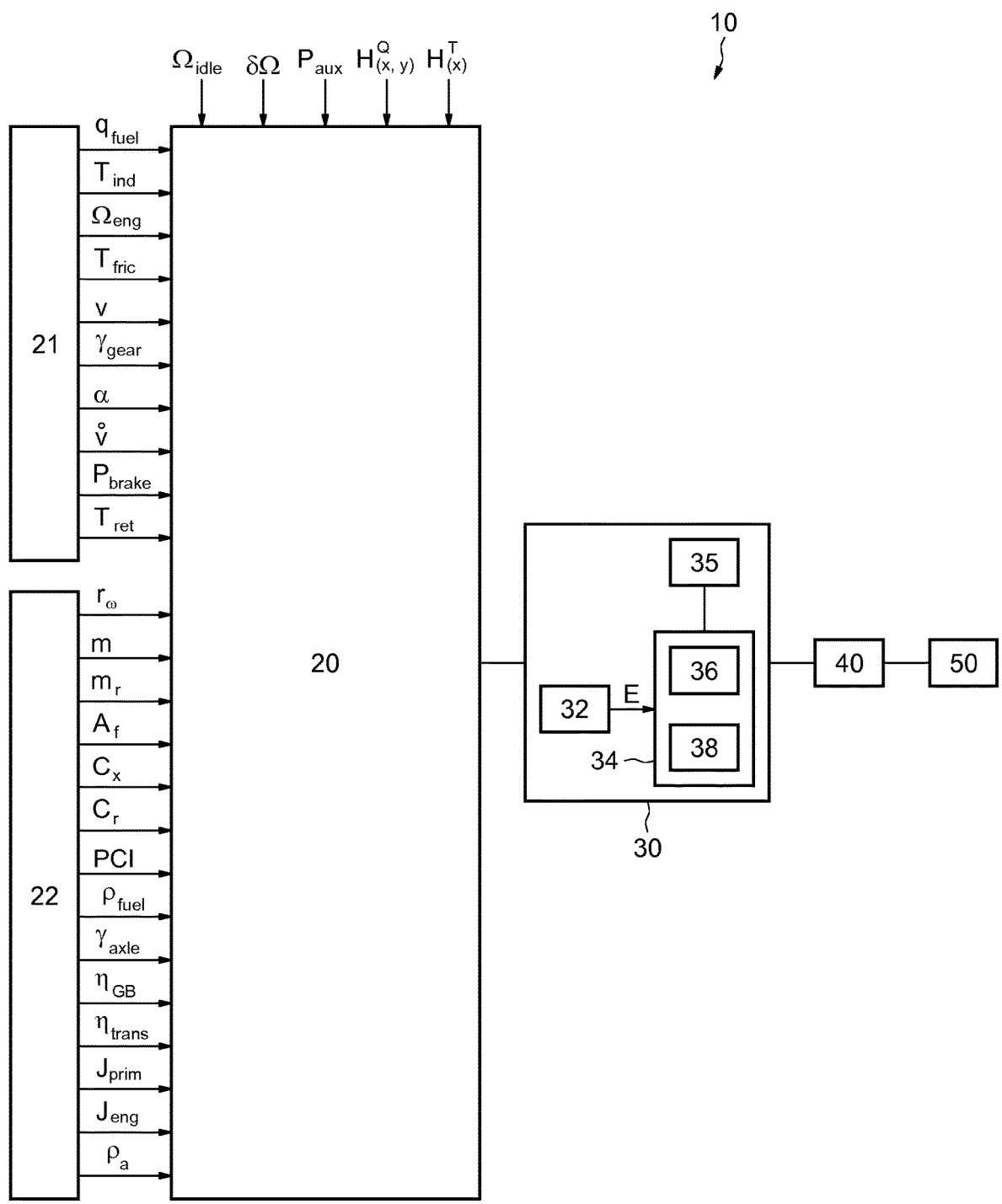
FIG. 1 schematically depicts the device for analysing the distribution of the energy expenditures of a vehicle according to the invention.

A device 10 for analysing the distribution of the energy expenditures of a motor vehicle comprises a data processing module 20, a module 30 for formulating an energy balance report on the motor vehicle, a module 40 for detecting the end of a journey and a module 50 for communicating the energy balance report to a server (not depicted), for example external to the vehicle, for example using telematic means.

The data processing module 20 receives as input data coming from a communications network 21 better known to those skilled in the art by the abbreviation "CAN: Controller Area Network". The data transmitted by the CAN network comprise the volume of fuel injected $q_{fuel}$, the indicated combustion engine torque $T_{ind}$, the engine speed $\Omega_{eng}$, the combustion engine mechanical friction torque $T_{fric}$, the vehicle speed v, the gearbox gear ratio engaged $\gamma_{gear}$, the local gradient of the roadway $\alpha$, the longitudinal acceleration of the vehicle $\dot{v}$, the position of the brake pedal $P_{brake}$ and the torque of the retarder $T_{ret}$.

The data processing module 20 also receives vehicle parameters derived from a database 22 of vehicle parameters housed in a computer (not depicted) of the motor vehicle or on a remote server. The vehicle parameters transmitted to the processing module 20 comprise:

the radius of the wheels $r_w$,
the mass of the vehicle m,
the equivalent mass of the running gear $m_r$. This mass is obtained from the characteristics of the corresponding components. Thus, the equivalent mass of the wheels is obtained from characteristics of the wheels and tyres, and the equivalent mass of the inertias of the drivetrain (engine, gearbox, transmission shaft . . . ) is obtained from the characteristics of the combustion engine (cylinder capacity and number of cylinders).
the rolling resistance coefficient for the tyres $c_r$. Because this coefficient is connected to the tyres, it evolves over time. In order to obtain the best possible accuracy on the mass estimate, provision could be made for this coefficient to be estimated using a special purpose estimation method.
the coefficients of the aerodynamic resistance, such as the vehicle air density $\rho_a$, the frontal area of the vehicle $A_f$, the coefficient of drag $c_x$.
the lower calorific value PCI, the density of the fuel $\rho_{fuel}$, the axle ratio $\gamma_{axle}$, the gearbox efficiency $\eta_{GB}$, the transmission efficiency $\eta_{TRANS}$, the constant due to gravity g, the inertia of the primary shaft $J_{prim}$ and the inertia of the running elements of the engine $J_{eng}$.

The data processing module 20 also receives three calibration constants: the engine speed at idle $\Omega_{idle}$, a constant regarding the level of uncertainty around the idling speed $\delta\Omega$, and a constant representing the mean power approximated by the auxiliary elements in a heavy duty vehicle $P_{aux}$. These constants are, for example, calibrated according to the knowledge of a person skilled in the art. Thus, the constant $P_{aux}$ is fixed between 2 kW and 6 kW, the constant $\Omega_{idle}$ is fixed at around 600 rpm, and the constant $\delta\Omega$ is fixed at around 200 rpm. The data processing module 20 also receives a map $H^Q(x, y)$ of fuel consumption, and a map $H^T(x)$ of the engine linking engine speed to effective torque.

Finally, by way of nonlimiting example, the data processing module 20 may also receive, in real-time, the position of the vehicle in the form of a latitude, a longitude and an altitude on the basis of satellite data received by the global positioning system (not depicted) so as to determine the gradient of the roadway $\alpha$.

The module 30 for formulating an energy balance report for the vehicle comprises a module 32 for calculating the energies at various stages along the drivetrain, in order therefrom to deduce a distribution of the energy expenditures of the vehicle.

The calculation module 32 calculates the energy $E_{fuel}$ produced by burning the fuel, the indicated mechanical energy $E_{ind}$, the energy $E_{fric}$ associated with the internal friction of the engine, the energy $E_{idle}$ expended during engine idling phases, the energy $E_{aux}$ expended by the auxiliary elements, the mechanical energy $E_{pwt}^{+,wo/losses}$ on the output side of the engine shaft, the mechanical energies $E_{pwt}^{+,w/losses}$ and $E_{pwt}^{-,w/losses}$ with respect to the wheel, the potential energy $E_g$, the kinetic energy $E_{inertia}$, the energy $E_{aero}^{wo/wind}$ associated with the aerodynamics of the vehicle and the energy $E_r$ associated with the rolling resistance. The exponent "wo/wind" is an abbreviation for the expression "without wind" which means to say that the equations are implemented without the presence of a wind sensor.

The energy $E_{fuel}$ produced by burning the fuel can be written according to the following equation:

$$E_{fuel} = PCI \cdot \rho_{fuel} \int_0^{Tend} q_{fuel}(t) \cdot dt \qquad \text{(Eq. 1)}$$

Where:
PCI is the lower calorific value or "lower heating value" corresponding to the amount of heat released by the complete combustion of a unit of fuel, expressed in MJ/kg;
$\rho_{fuel}$ is the density of the fuel, expressed in kg/L;
$q_{fuel}$ is the volume of fuel injected, expressed in L/s; and
Tend is the end of the calculation of the distribution of energy expenditures.

The indicated mechanical energy $E_{ind}$ can be written according to the following equation:

$$E_{ind} = \int_0^{Tend} T_{ind}(t) \cdot \Omega_{eng}(t) \cdot dt \qquad (Eq.\ 2)$$

Where:

$T_{ind}$ is the indicated combustion engine torque, expressed in N·m; and $\Omega_{eng}$ is the engine speed, expressed in rad·s$^{-1}$.

The energy $E_{fric}$ associated with the internal friction of the engine can be written according to the following equation:

$$E_{fric} = \int_0^{Tend} T_{fric}(t) \cdot \Omega_{eng}(t) \cdot dt \qquad (Eq.\ 3)$$

Where:

$T_{fric}$ is the combustion engine mechanical friction torque, expressed in N·m.

In order not to account twice for the energy associated with the internal friction of the engine, it is desirable to make a distinction between the energy $E_{frix}^{w/idle}$ associated with the internal friction of the engine during engine idling phases, and the energy $E_{frix}^{wo/idle}$ associated with the internal friction of the engine during engine idling phases outside of the engine idling phases:

$$E_{frix}^{w/idle} = \int_0^{Tend} T_{fric}(t) \cdot \Omega_{eng}(t) \cdot dt \cdot s.t. |\Omega_{eng} - \Omega_{idle}| < \delta\Omega \qquad (Eq.\ 4)$$

When $|\Omega_{eng}-\Omega_{idle}|<\delta\Omega$ $$E_{frix}^{wo/idle} = \int_0^{Tend} T_{fric}(t) \cdot \Omega_{eng}(t) \cdot dt \qquad (Eq.\ 5)$$

When $|\Omega_{eng}-\Omega_{idle}|\geq\delta\Omega$

Where:

$\Omega_{idle}$ is the engine idling speed expressed in rad·s$^{-1}$; and $\delta\Omega$ is a constant relating to the level of uncertainty around the idling speed, expressed in rad·s$^{-1}$.

The energy $E_{idle}$ expended during the engine idling phases can be written according to the equation Eq. 4:

$$E_{idle} = E_{frix}^{w/idle} = \int_0^{Tend} T_{fric}(t) \cdot \Omega_{eng}(t) \cdot dt$$

The energy $E_{aux}$ expended by the auxiliary elements can be written according to the following equation:

$$E_{aux} = P_{aux} \int_0^{Tend} t \cdot dt \qquad (Eq.\ 6)$$

Where:

$P_{aux}$ is a constant representing the mean power approximated by the auxiliary elements in a heavy duty vehicle, given by a database, expressed in kW.

The mean power $P_{aux}$ can be broken down into the auxiliary power needed for vehicle traction, notably needed by the air compressor, the power steering, the alternator, into auxiliary power associated with comfort, notably the air conditioning, the heating etc., and into the auxiliary power specific to the power take-off systems, notably when the vehicle is stationary.

The mechanical energy at the wheel $E_{pwt}^{+,wo/losses}$ corresponds to the energy of the powerplant, and can be written according to the following equation:

$$E_{pwt}^{+,wo/losses} = \frac{\gamma_{axle}}{r_w} \int_0^{Tend} (T_{ind}(t) - T_{fric}(t)) \cdot v(t) \cdot \gamma_{gear}(t) \cdot dt \qquad (Eq.\ 7)$$

When $T_{ind}(t)>0$

Where:

$\gamma_{axle}$ is the axle ratio, which is dimensionless;

$r_w$ is the radius of the wheel, expressed in m;

$v$ is the speed of the vehicle, expressed in m·s$^{-1}$;

$\gamma_{gear}$ is the gearbox gear ratio engaged, which is dimensionless.

The mechanical energies $E_{pwt}^{+,w/losses}$ and $E_{pwt}^{-,w/losses}$ with respect to the wheel, can be written according to the following equations:

$$E_{pwt}^{+,w/losses} = \eta_{GB} \cdot \eta_{Trans} \cdot E_{pwt}^{+,wo/losses} \qquad (Eq.\ 8)$$

$$E_{pwt}^{-,w/losses} = \frac{1}{\eta_{GB}\eta_{Trans}} \cdot E_{pwt}^{+,wo/losses} \qquad (Eq.\ 9)$$

Where:

$\eta_{GB}$ is the gearbox efficiency, which is dimensionless; and $\eta_{TRANS}$ is the transmission efficiency, which is dimensionless.

The potential energy $E_g$ can be written according to the following equation:

$$E_g = m \cdot g \cdot \int_0^{Tend} v(t) \cdot \sin(\alpha(t)) \cdot dt \qquad (Eq.\ 10)$$

Where:

m is the mass of the vehicle, expressed in kg;

g is the constant due to gravity, expressed in N/kg; and $\alpha$ is the gradient of the roadway, expressed in rad.

It may also be beneficial to determine the positive potential energy stored up during the journey:

$$E_g^+ = \int_0^{Tend} v(t) \cdot F_g(t) \cdot dt \qquad (Eq.\ 11)$$

When $\sin(\alpha(t))>0$

The force induced by gravity $F_g(t)$ is determined in the remainder of the description using equation Eq.20.

The kinetic energy $E_{inertia}$ can be written according to the following equation:

$$E_{inertia} = E_{inertia}^v + E_{inertia}^{eng} \qquad (Eq.\ 12)$$

Where:

$$E_{inertia}^v = (m + m_r) \cdot \int_0^{Tend} \dot{v}(t) \cdot v(t) \cdot dt \text{ when } v(t) > v_0 \qquad (Eq.\ 13)$$

-continued $$E_{inertia}^{eng} = \qquad (Eq.\ 14)$$

$$\frac{\eta_{eng} \cdot \eta_{Trans} \cdot (J_{prim} + J_{eng}) \cdot \gamma_{axle}^2}{r_w^2} \cdot \int_0^{Tend} \dot{v}(t) \cdot v(t) \cdot \gamma_{gear}^2 dt$$

when $v(t) > v_0$

Where:

$m_r$ is the equivalent mass of the running elements, expressed in kg;

$\dot{v}$ is the longitudinal acceleration of the vehicle, expressed in m·s$^{-2}$;

$J_{prim}$ is the inertia of the primary shaft, expressed in kg·m$^2$;

$J_{eng}$ is the inertia of the running elements of the engine, expressed in kg·m$^2$; and $v_0$ is a threshold constant so as not to consider very low speeds, $v_0$ is, for example, equal to 1 km/h.

The energy $E_{aero}^{w/wind}$ associated with the aerodynamics of the vehicle can be written according to the following equation:

$$E_{aero}^{w/wind} = \frac{1}{2} \cdot \rho_a \cdot A_f \cdot c_x \cdot \int_0^{Tend} (v(t) - v_{wind}(t))^2 \cdot v(t) \cdot dt \qquad (Eq.\ 15)$$

Where:

$\rho_a$ is the density of the air, expressed in kg·m$^{-3}$;

$A_f$ is the frontal area of the vehicle, expressed in m$^2$;

$c_x$ is the coefficient of drag, which is dimensionless; and $v_{wind}$ is the wind speed, expressed in m·s−1.

The wind speed is information that is not always available at vehicle level. In one exemplary embodiment, this wind speed is obtained by external means not detailed here and which do not form part of the present invention.

However, the wind speed $v_{wind}$ can be neglected, notably in cases in which the information is not available, and in that case, equation Eq. 15 can be written:

$$E_{aero}^{w/wind} = \frac{1}{2} \cdot \rho_a \cdot A_f \cdot c_x \cdot \int_0^{Tend} v^3(t) \cdot dt$$

The energy $E_r$ associated with the rolling resistance can be written according to the following equation:

$$E_r = c_r \cdot m \cdot \int_0^{Tend} v(t) \cdot \cos(\alpha(t)) \cdot dt \qquad (Eq.\ 16)$$

Where:

$c_r$ is the rolling resistance coefficient for the tyres, which is dimensionless.

The module 30 for formulating an energy balance report on the vehicle further comprises a module 34 for analysing the energy expenditures of the vehicle as determined by the energy calculation module 32.

The module 34 for analysing the energy expenditures comprises a module 36 for analysing the resistive forces that compares the energy flows calculated in Equations 1 to 16 with a physical model of the vehicle, provided by a database 35, simulating the same journey. Reference may be made to Equations 25 to 32 below for the dynamic models of vehicle fuel consumption.

The vehicle dynamics equation which connects the forces acting on the vehicle with the mass of the vehicle yields Equation Eq. 17:

$$(m_v + m_r) \cdot \dot{v}(t) = F_t(t) - F_{ext}(t) - F_{dist}(t) \qquad (Eq.\ 17)$$

Where:

$m_v$ is the mass of the vehicle, expressed in kg;

$m_r$ is the equivalent mass of the running elements, expressed in kg;

$\dot{v}$ is the longitudinal acceleration of the vehicle, expressed in m·s$^{-2}$;

$F_t(t)$ is the traction force applied to the vehicle, expressed in N;

$F_{ext}(t)$ is the external forces applied to the vehicle, expressed in N; and $F_{dist}(t)$ is the force associated with the modelling errors.

The set of external forces $F_{ext}(t)$ applied to the vehicle combines the aerodynamic friction force $F_a(t)$, the rolling resistance force $F_r(t)$ and the force induced by gravity $F_g(t)$.

The aerodynamic friction force $F_a(t)$ is dependent on the vehicle air density $\rho_a$, on the frontal area of the vehicle $A_f$, on the coefficient of drag $c_x$ and on the relative speed at which the vehicle makes progress with respect to the air ($v - v_{wind}$) The aerodynamic friction force $F_a(t)$ can be written according to the following equation:

$$F_a(v) = \frac{1}{2} \cdot \rho_a \cdot A_f \cdot c_x \cdot (v - v_{wind})^2 \qquad (Eq.\ 18)$$

The relative wind speed $v_{wind}$ is unknown and so to calculate Equation Eq.3, it is assumed that this speed is negligible, insofar as it has no impact on the accuracy of the energy expenditures analysis.

The rolling resistance force $F_r(t)$ is dependent on the mass of the vehicle $m_v$, on the rolling resistance coefficient for the tyres $c_r$ and on the gradient of the roadway $\alpha$ as described in the following equation:

$$F_r(v) = c_r \cdot m_v \cdot \cos(\alpha) \qquad (Eq.\ 19)$$

The force induced by gravity $F_g(t)$ is dependent on the mass of the vehicle on the gravity constant g and on the gradient of the roadway $\alpha$ as described in the following equation:

$$F_g(\alpha) = m_v \cdot g \cdot \sin(\alpha) \qquad (Eq.\ 20)$$

From an energy standpoint, Equation Eq. 17 can be written:

$$E_{pwt} - E_{inertia} - E_g = E_r + E_{aero}^{w/wind} \qquad (Eq.21)$$

Because the braking torque and the torque of the retarder are not available, the energies are calculated only when the engine torque is positive, namely under the following condition:

$$T^+(t) = [v(t) > v_0; T_{ret}(t) > 1, P_{brake}(t) = 0; \gamma_{gear}(t) > 0.1; T_{ret}(t) = 0]$$

Where:

$P_{brake}$ is the position of the brake pedal, which is dimensionless; and $T_{ret}$ is the torque of the retarder, expressed as a %.

Thus, this is used to deduce the following equation:

$$E_{pwt}^{+T^+} - E_{inertia}^{T^+} - E_g^{T^+} = E_r^{T^+} + E_{aero}^{w/wind\ T^+} \qquad (Eq.\ 22)$$

The measured energy $E_{meas}^{res}$ associated with resistive forces can be written according to the following equation:

$$E_{meas}^{res} = E_{pwt}^{T^+} - E_{inertia}^{T^+} - E_{g}^{T^+} = E_{r}^{T^+} \quad \text{(Eq. 23)}$$

The modelled energy $E_{model}^{res}$ associated with resistive forces can be written according to the following equation:

$$E_{model}^{res} = E_{r}^{T^+} + E_{aero}^{wlwind\,T^+} \quad \text{(Eq. 24)}$$

The module 36 for analysing the resistive forces compares the measured energy with that from the model: $E_{meas}^{res} - E_{model}^{res}$.

If the two energies are equal: $E_{meas}^{res} - E_{model}^{res}$, that means that the model is correctly reproducing the measurements. This also indicates that the influence of the wind $v_{wind}$ is small.

If $E_{meas}^{res} > E_{model}^{res}$, then the resistive forces in actual fact have been more significant than the model had calculated. That may be explained by the fact that one of the constants $c_x$ or $c_r$ is higher than the value indicated in the model or that the wind on the journey has been of appreciable strength without being compensated for over the entirety of the journey.

If $E_{meas}^{res} < E_{model}^{res}$, then the resistive forces in actual fact have been less significant than the model had calculated. That may be explained by the fact that one of the constants $c_x$ or $c_r$ is lower than the value indicated in the model.

There are various sources of error that may be present when calculating the energy breakdown, notably delays on measurements coming from various sensors or inherent errors associated with the modelling of the vehicle. It is thus preferable to analyse the distribution of energy expenditures over a plurality of journeys.

It may also be emphasized that once the energy balance report has been created and communicated to an external server, it is possible to analyse not the absolute value of the difference between the modelled energy and the measured energy, but how this difference evolves from one journey to another, the analysis being performed using the one same model over the plurality of journeys.

In addition to the analysis of the resistive forces that enable vehicle parameter validation, an analysis of the fuel consumption is also made.

The module 34 for analysing the energy expenditures for this purpose comprises a module 38 for analysing the fuel consumption by comparing the measured consumption with consumptions taken from various models derived from databases simulating the same journey under standard conditions. Reference may be made to Equations 25 to 32 below for the dynamic models of vehicle fuel consumption.

Thus, it is possible to normalize the journey and the vehicle so as to be able subsequently to compare the performance of several vehicles and rank them according to their fuel consumption against a standard usage.

The module 38 for analysing the fuel consumption calculates the quantity $Q_{f\,eng}$ of fuel injected from the engine speed and from a consumption map $H^Q(x,y)$:

$$Q_{eng} = \frac{1}{\rho} \int_0^{Tend} \Omega_{end}(t) \cdot H^Q(\Omega_{eng}(t), (T_{ind}(t) - T_{fric}(t)) \cdot dt \quad \text{(Eq. 25)}$$

When $\Omega_{eng}(t) > 200 \frac{\pi}{180}$

Where:

$H^Q(x,y)$ is a map of the engine linking engine speed and effective torque with a quantity of fuel injected.

The module 38 for analysing the fuel consumption also calculates the quantity $Q_f$ of fuel injected from the speed profile and from the gradient profile:

$$Q_f = \frac{1}{\rho} \int_0^{Tend} \Omega_{eng}(t) \cdot H^Q(\Omega_{eng}(t), h(t)) \cdot dt \quad \text{(Eq. 26)}$$

When $\Omega_{eng}(t) > 200 \frac{\pi}{180}$

Where:

$$h(t) = SAT_{\underline{Te}}^{\overline{Te}} \cdot \left( \frac{r_w}{\gamma_{gear}\lambda_{axle}} (F_{inertia} + F_r + F_{aero} + F_g) \right) \quad \text{(Eq. 27)}$$

$$\overline{Te} = \max(H^T \cdot (\Omega_{eng}(t))) \quad \text{(Eq. 28)}$$

$$\underline{Te} = \min(H^T \cdot (\Omega_{eng}(t))) \quad \text{(Eq. 29)}$$

$H^T(x)$ is a map of the engine linking engine speed with effective torque.

The module for analysing the fuel consumption then calculates the quantity $Q_{f,sd}$ of fuel injected from the speed profile and from the gradient profile under standard conditions, namely conditions in which $\alpha=0$:

$$Q_{f,sd} = \frac{1}{\rho} \int_0^{Tend} \Omega_{eng}(t) \cdot H^Q(\Omega_{eng}(t), h_{sd}(t)) \cdot dt \quad \text{(Eq. 30)}$$

When $\Omega_{eng}(t) > 200 \frac{\pi}{180}$

Where:

$$h_{sd}(t) = Sat_{\underline{Te}}^{\overline{Te}} \cdot \left( \frac{r_w}{\gamma_{gear}\lambda_{axle}} (F_{inertia} + F_r + F_{aero}) \right) \quad \text{(Eq. 31)}$$

The module for analysing the fuel consumption also calculates the quantity $Q_{f,v,sd}$ of fuel injected from the speed profile and from the gradient profile under standard conditions, and on a normalized vehicle, namely conditions in which $\alpha=0$:

$$Q_{f,v,sd} = \frac{1}{\rho} \int_0^{Tend} \Omega_{eng}(t) \cdot H^Q(\Omega_{eng}(t), h_{v,sd}(t)) \cdot dt \quad \text{(Eq. 32)}$$

When $\Omega_{eng}(t) > 200 \frac{\pi}{180}$

Where:

$$h_{v,sd}(t) = Sat_{\underline{Te}}^{\overline{Te}} \cdot \left( \frac{r_w}{\gamma_{gear}\lambda_{axle}} \left( (F_{inertia} + F_r) \cdot \frac{m_0}{m} + F_{aero} \right) \right) \quad \text{(Eq. 33)}$$

m is the mass of the vehicle; and $m_0$ is the mass of the normalized vehicle. What is considered here is a vehicle of constant mass, such as an 18 T vehicle, so as to compare, over a similar journey, two vehicles of different masses with respect to a similar reference.

The fuel consumptions calculated in Equations Eq. 25 to Eq. 32 are then compared with each other in order to determine whether the consumption of the vehicle is normal.

The gearshift occurrence needs to be zero during all the calculation operations.

Once the energy balance report has been formulated, and the end of the journey has been detected, it is transmitted to an external server by telematic means.

It is thus possible to group, over several journeys, and for the one same vehicle, the energy balance report formulated for each journey and to make a reliable check on the performance of the vehicle.

It is also possible to group the energy balance reports over several journeys, and for a plurality of motor vehicles, in order to detect, with in the one same fleet of vehicles, those which have a high fuel consumption, and those journeys which require a high fuel consumption, for example because of changes in level, or because of a strong wind presence.

Figure 2:
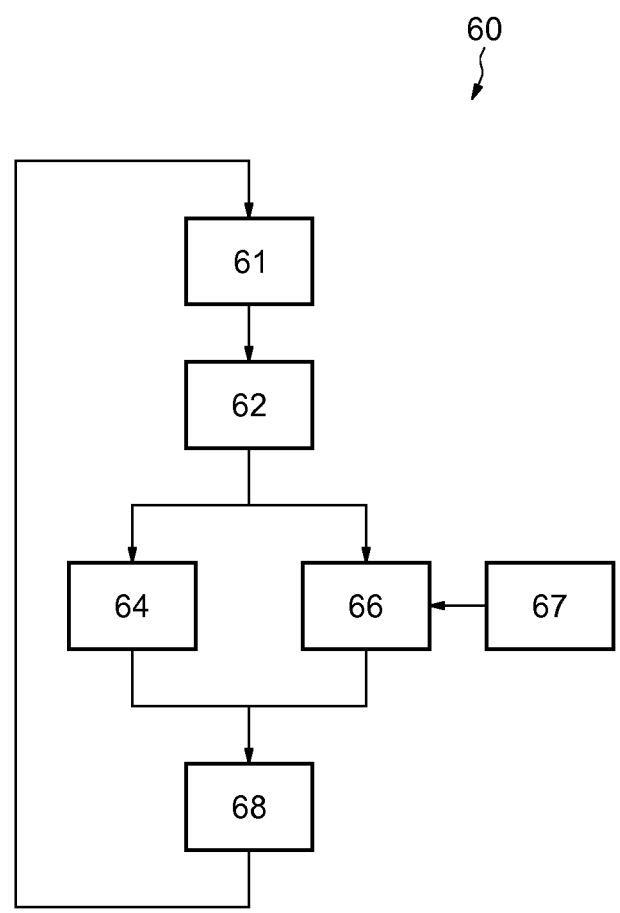
FIG. 2 illustrates the steps of the method for analysing the distribution of the energy expenditures of a vehicle according to the invention.

The flow diagram depicted in FIG. 2 illustrates the method 60 for analysing the energy distribution of a motor vehicle.

During a first step 61, data is collected, the data comprising: the volume of fuel injected $q_{fuel}$, the indicated combustion engine torque $T_{ind}$, the engine speed $\Omega_{eng}$, the combustion engine mechanical friction torque $T_{ind}$, the vehicle speed v, the gearbox gear ratio engaged $\gamma_{gear}$, the gradient of the roadway $\alpha$, the longitudinal acceleration of the vehicle $\dot{v}$, the position of the brake pedal $P_{brake}$ and the torque of the retarder $T_{ret}$, the radius of the wheels $r_w$, the mass of the vehicle m, the equivalent mass of the running elements $m_r$, the rolling resistance coefficient for the tyres $c_r$, the aerodynamic resistance coefficients, such as the vehicle air density $\rho_a$, the frontal area of the vehicle $A_f$, the coefficient of drag $c_x$, the lower calorific value PCI, the density of the fuel $\rho_{fuel}$, the axle ratio $\gamma_{axle}$, the gearbox efficiency $\eta_{GB}$, the transmission efficiency $\eta_{TRANS}$, the inertia of the primary shaft $J_{prim}$ and the inertia of the running elements of the engine $J_{eng}$.

Three calibration constants are also gathered: the engine speed at idle $\Omega_{idle}$, a constant regarding the level of uncertainty around the idling speed $\delta\Omega$, and a constant representing the mean power approximated by the auxiliary elements in a heavy-duty vehicle $P_{aux}$, as well as a map $H^Q$ (x,y) of fuel consumption and a map $H^T(x)$ of the engine linking engine speed with effective torque.

By way of nonlimiting example, it is also possible, in real-time, to collect the position of the vehicle in the form of a latitude, a longitude and an altitude on the basis of satellite data received by the global positioning system GPS (not depicted) so as to determine the gradient of the roadway $\alpha$.

During a second step 62, the following energies are calculated: the energy $E_{fuel}$ produced by burning the fuel, the indicated mechanical energy $E_{ind}$, the energy $E_{fric}$ associated with the internal friction of the engine, the energy $E_{idle}$ expended during engine idling phases; the energy $E_{aux}$ expended by the auxiliary elements, the mechanical energy $E_{pwt}^{+,wo/losses}$ on the output side of the engine shaft, the mechanical energies $E_{pwt}^{+,w/losses}$ and $E_{pwt}^{-,w/losses}$ with respect to the wheel, the potential energy $E_g$, the kinetic energy $E_{inertia}$, the energy $E_{aero}^{wo/wind}$ associated with the aerodynamics of the vehicle and the energy $E_r$ associated with the rolling resistance.

During a third step 63, the energy expenditures of the vehicle, as determined during the second step 62, are analysed by analysing, in step 64, the resistive forces by comparing the energy flows calculated in Equations 1 to 16 with a physical model of the vehicle, and by analysing, in step 66, the fuel consumption by comparing the measured fuel consumption with the fuel consumptions taken from models 67 derived from databases simulating the same journey under standard conditions, namely without gradient. Thus, it is possible to normalize the journey and the vehicle so as to be able subsequently to compare the performance of several vehicles and rank them according to their fuel consumption against a standard usage.

During a fourth step 68, an energy balance report is formulated for the vehicle, indicating the fuel consumption, and making it possible to detect a potential anomaly between the measurements and the model (the presence of wind, a significant difference in the coefficient of drag . . . )

By virtue of the invention, it is possible to normalize the journey and the vehicle so as to be able subsequently to compare the performance of several vehicles and rank them according to their fuel consumption against a standard usage. It is also possible to ensure the validity of the parameters of the vehicle model and to rank all of the vehicles of the one same fleet according to their fuel consumption.

The invention claimed is:

1. A device-implemented method for analyzing the distribution of energy expenditures of a motor vehicle from data from a communications network and from parameters of the vehicle, the method comprising:

calculating energy expenditures of the vehicle over a journey;

analyzing the energy expenditures by comparing them with a predetermined model of the vehicle simulating the same journey;

formulating an energy balance report on the basis of the analysis of the energy expenditures and of the fuel consumption;

telematically communicating the energy balance report to an external server, wherein the external server receives a plurality of the energy balance reports, corresponding to a respective plurality of journeys of the vehicle, from which a check on performance of the vehicle is made;

gathering by a data processing module, prior to the calculating energy expenditures step, data from the communications network by the data processing module receiving a data transmission via the communications network, the data comprising data selected from the group consisting of the volume of fuel injected $q_{fuel}$, the indicated combustion engine torque $T_{ind}$, the engine speed $\Omega_{eng}$, the combustion engine mechanical friction torque $T_{fric}$, the vehicle speed v, the gearbox gear ratio engaged $\gamma_{gear}$, the gradient of the roadway $\alpha$, the longitudinal acceleration of the vehicle $\dot{v}$, the position of the brake pedal $P_{brake}$ and the torque of the retarder $T_{ret}$;

gathering by the data processing module, prior to the calculating energy expenditures step, data transmitted from a database of vehicle parameters housed in a computer of the vehicle or on a remote server, the parameters being selected from the group consisting of the radius of the wheels $r_w$, the mass of the vehicle m, the equivalent mass of the running elements $m_r$, the rolling resistance coefficient for the tires $c_r$, the vehicle air density $\rho_a$, the frontal area of the vehicle $A_f$, the coefficient of drag $c_x$, the lower calorific value PCI, the density of the $\rho_{fuel}$, the axle ratio $\gamma_{axle}$, the gearbox efficiency $\eta_{GB}$, the transmission efficiency $\mu_{TRANS}$, the inertia of the primary shaft $J_{prim}$ and the inertia of the running elements of the engine $J_{eng}$; and gathering by the data processing module, prior to the calculating energy expenditures step, the engine speed at idle $\Omega_{idle}$, the mean power approximated by the auxiliary elements $P_{aux}$, a map $H^Q(x, y)$ of fuel consumption, and a map $H^T(x)$ of the physical limits of the engine, wherein, during the step of calculating the energy expenditures:

the energy $E_{fuel}$ produced by burning the fuel is calculated on the basis of the lower calorific value PCI, of the volume of fuel injected $q_{fuel}$, and of the density of the fuel $\rho_{fuel}$, the indicated mechanical energy $E_{ind}$ is calculated on the basis of the indicated combustion engine torque $T_{ind}$ and of the engine speed $\Omega_{eng}$, the energy $E_{fric}$ associated with internal friction within the engine is calculated on the basis of the combustion engine mechanical friction torque $T_{fric}$ and of the engine speed $\Omega_{eng}$, the energy $E_{idle}$ expended during the engine idling phases is calculated on the basis of the combustion engine mechanical friction torque $T_{fric}$, of the engine speed $\Omega_{eng}$, and of the engine idling speed $\Omega_{idle}$, the energy $E_{aux}$ expended by the auxiliary elements is calculated on the basis of the mean power approximated by the auxiliary elements $P_{aux}$, the mechanical energy $E_{pwt}^{+,wo/losses}$ on the output side of the engine shaft is calculated on the basis of the indicated combustion engine torque $T_{ind}$, of the vehicle speed v, of the combustion engine mechanical friction torque $T_{fric}$, and of the gearbox gear ratio engaged $\gamma_{gear}$, the mechanical energies $E_{pwt}^{+,w/losses}$ and $E_{pwt}^{-,w/losses}$ with respect to the wheel are calculated on the basis of the mechanical energy $E_{pwt}^{+,wo/losses}$ on the output side of the engine shaft, of the radius of the wheels $r_w$, of the axle ratio $\gamma_{axle}$, of the gearbox efficiency $\eta_{GB}$, and of the transmission efficiency $\eta_{TRANS}$, the potential energy $E_g$ is calculated on the basis of the mass of the vehicle m, of the vehicle speed v, and of the gradient of the roadway $\alpha$, the kinetic energy $E_{inertia}$ is calculated on the basis of the vehicle speed v, of the longitudinal acceleration of the vehicle v̇, of the mass of the vehicle m, of the equivalent mass of the running elements $m_r$, of the axle ratio $\gamma_{axle}$, of the gearbox efficiency $\eta_{GB}$, of the transmission efficiency $\eta_{TRANS}$, of the inertia of the primary shaft $J_{prim}$, of the inertia of the running elements of the engine $J_{eng}$, of the gearbox gear ratio engaged and of the radius of the wheels, the energy $E_{aero}^{wo/wind}$ associated with the aerodynamics of the vehicle is calculated on the basis of the vehicle air density $\rho_a$, of the frontal area of the vehicle $A_f$, of the coefficient of drag $c_x$, and of the vehicle speed v, and the energy $E_r$ associated with the rolling resistance is calculated on the basis of the mass of the vehicle m, of the rolling resistance coefficient for the tires $c_r$ and of the gradient of the roadway $\alpha$.

2. The method according to claim 1, wherein, during the analyzing energy expenditures step, resistive forces are analyzed by comparing the calculated energy expenditures with a model of the vehicle, supplied by a database, simulating the same journey under standard conditions in which the gradient is zero, and the fuel consumption is analyzed by comparing a measured fuel consumption with an estimate of the fuel consumption, derived from the model of the vehicle.

3. The method according to claim 2, wherein, during the analysis of the resistive forces, the measured energy $E_{meas}^{res}$ associated with the resistive forces is calculated on the basis of the mechanical energy $E_{pwt}^{+,wo/losses}$ on the output side of the engine shaft, of the kinetic energy $E_{inertia}$, and of the potential energy $E_g$, the modelled energy $E_{model}^{res}$ associated with the resistive forces is calculated on the basis of the energy $E_{aero}^{wo/wind}$ associated with the aerodynamics and of the energy $E_r$ associated with the rolling resistance, and the energies $E_{meas}^{res}$, $E_{model}^{res}$ associated with resistive forces are compared.

4. The method according to claim 2, wherein, during the analysis of the fuel consumption, a first quantity $Q_{eng}$ of fuel injected is calculated on the basis of the engine speed $Q_{eng}$ and of a map $H^Q(x, y)$ of fuel consumption.

5. The method according to claim 4, wherein, during the analysis of the fuel consumption, a second quantity $Q_f$ of fuel injected is calculated on the basis of the speed profile and of the gradient profile and of an engine map $H^T(x)$ that connects engine speed with effective torque.

6. The method according to claim 5, wherein, during the analysis of the fuel consumption, a third quantity $Q_{f,sd}$ of fuel injected is calculated on the basis of the speed profile and of the gradient profile under standard conditions in which the gradient is zero, and a fourth quantity $Q_{f,v,sd}$ of fuel injected is calculated on the basis of the speed profile and of the gradient profile under standard conditions in which the gradient is zero and on a model of the vehicle simulating the same journey under standard conditions in which the gradient is zero and the third and fourth quantities of fuel are compared with the first and second quantities of fuel.

7. The method according to claim 1, wherein the energy expenditures are calculated only if the position of the brake pedal $P_{brake}$ and the torque of the retarder $T_{ret}$ are zero and no gearshift is in progress.

* * * * *